(12) United States Patent
Stroh et al.

(10) Patent No.: US 7,392,923 B2
(45) Date of Patent: Jul. 1, 2008

(54) ULTRASONIC WELDING MACHINE, AS WELL AS TOOL FOR AN ULTRASONIC WELDING MACHINE

(75) Inventors: Dieter Stroh, Wettenberg (DE); Horst Dieterle, Niederweimar (DE); Udo Wagenbach, Buseck (DE)

(73) Assignee: Schunk Ultraschalltechnik GmbH, Wettenberg (DE)

( * ) Notice: Subject to any disclaimer, the term of this patent is extended or adjusted under 35 U.S.C. 154(b) by 572 days.

(21) Appl. No.: 11/062,759

(22) Filed: Feb. 23, 2005

(65) Prior Publication Data
US 2005/0199676 A1    Sep. 15, 2005

(30) Foreign Application Priority Data
Feb. 23, 2004    (DE) .................. 10 2004 009 048

(51) Int. Cl.
*H01R 43/20* (2006.01)
*H01R 43/00* (2006.01)

(52) U.S. Cl. .................... 228/1.1; 228/110.1; 156/73.1; 156/73.3; 156/580.1; 156/580.2

(58) Field of Classification Search ............... 228/1.1, 228/110.1; 156/73.1, 73.3, 580.1, 580.2
See application file for complete search history.

(56) References Cited

U.S. PATENT DOCUMENTS

| 6,574,944 | B2 * | 6/2003 | Capodieci .................... 53/450 |
| 7,124,504 | B2 * | 10/2006 | Steiner et al. .................. 29/860 |
| 2002/0053405 | A1 * | 5/2002 | Sans ........................ 156/379.8 |
| 2003/0094481 | A1 * | 5/2003 | Horie et al. ............ 228/180.22 |

FOREIGN PATENT DOCUMENTS

| DE | 69 605735 | 8/1986 |
| EP | 0 083707 | 7/1983 |
| EP | 0 286975 | 10/1988 |
| EP | 0 723713 | 7/1996 |
| WO | 02 43915 | 6/1902 |

* cited by examiner

*Primary Examiner*—Jerry Lorengo
*Assistant Examiner*—Nicholas P D'Aniello
(74) *Attorney, Agent, or Firm*—Dennison, Schultz & MacDonald

(57) ABSTRACT

An ultrasonic welding machine having a tool in the form of, for example, a sonotrode. In order to allow for an optimal utilization of the working surfaces of the sonotrode, it is proposed to move or mount the sonotrode in a desired position with respect to the element that connects the ultrasonic welding machine to the sonotrode by rotating the sonotrode around its longitudinal axis as well as a transverse axis running perpendicular thereto.

14 Claims, 3 Drawing Sheets

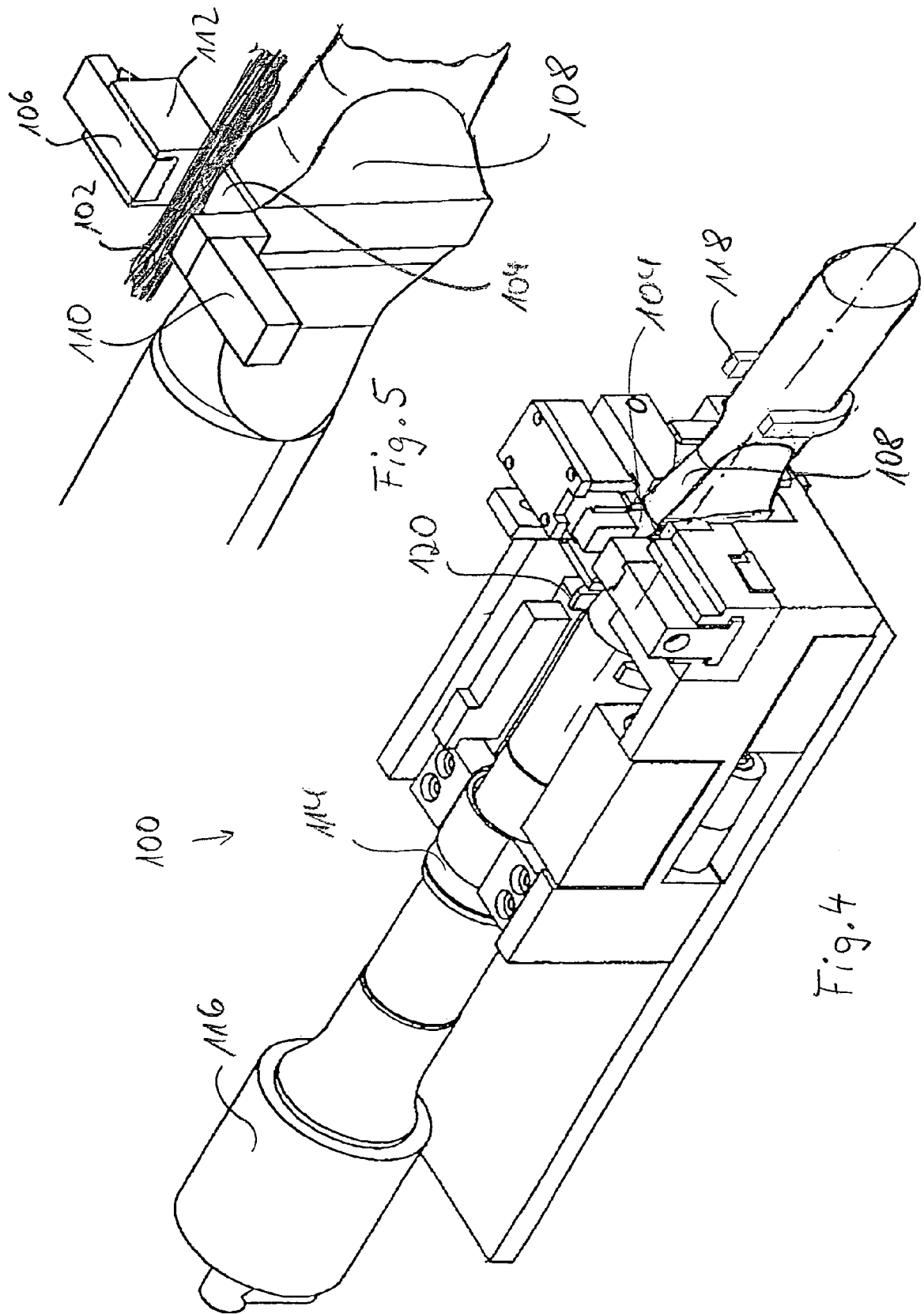

ULTRASONIC WELDING MACHINE, AS WELL AS TOOL FOR AN ULTRASONIC WELDING MACHINE

BACKGROUND OF THE INVENTION

The invention concerns an ultrasonic welding machine having a tool in the form of a sonotrode, a backplate electrode, or a side element with four working surfaces that delimits a compression chamber, wherein these surfaces can be selectively aligned on the material to be welded, for example, flexible wires or pipes made of metal, and extend across at least one end face of the tool passed through by the longitudinal axis of the tool, wherein the end face rests on an element such as a mounting, booster, or converter, via which the tool is connected to the ultrasonic welding machine, and wherein the tool is rotated around the longitudinal axis in order to align one of the working surfaces on the material in a desired position with respect to the element. The invention concerns also a tool of an ultrasonic welding machine in the form of a sonotrode having two mutually opposite end faces, as well as at least one surface running between the end faces and perpendicular or approximately perpendicular to the end faces, which is a working surface when aligned on a backplate electrode.

From EP-A-0 083 707 an ultrasonic welding machine with tools is known, which comprises a sonotrode with four working surfaces, and an anvil with four working surfaces. Thereby, the sonotrode as well as also the anvil can be rotated around its, or their respective longitudinal axis in order to make possible an alignment of the working surfaces on compression chambers having different cross sections.

From EP-A-0 286 975, as well as also from U.S. Pat. No. 4,782,990 ultrasonic welding machines are known in which the backplate electrode can be shifted by 180° in order to make available different working surfaces, which delimit a compression chamber.

An ultrasonic welding machine according to EP-B-0 723 713 comprises a sonotrode that generates ultrasonic vibrations, of which one section is a first boundary surface serving as working surface of a compression chamber, which is adjustable in height and width, preferably rectangular in cross section, and open on the face side. The remaining boundary and working surfaces are formed by sections of a multi-piece backplate electrode as well as a side shifting device.

From EP-B-0 761 370 an ultrasonic welding machine is known in which each of the mutually opposite end faces of the sonotrode is connected to a booster. The length of the sonotrode corresponds to the wavelength λ of the ultrasonic waves. In the antinode of the sonotrode, which has a cylindrical shape, several projections forming working surfaces are provided. In order to align each of the working surfaces on a backplate electrode (also called anvil), the sonotrode must be rotated around its longitudinal axis.

In WO-A-02/43915 an ultrasonic welding machine is described in which a side shifting device delimits a compression chamber. The side shifting device has several working surfaces. The side shifting device can be rotated and/or turned in order to align each one of the working surfaces on a compression chamber.

SUMMARY OF THE INVENTION

It is an objective of the invention to further develop an ultrasonic welding machine of the kind described above, wherein the utilized tool makes possible an optimal utilization of the surfaces serving as working surfaces.

In order to solve this problem the invention proposes to move or mount the tool in a desired position with respect to the element that connects the ultrasonic welding device to the tool by rotating the same around its longitudinal axis as well as the transverse axis running perpendicular thereto.

In a deviation from the known state of the art, an ultrasonic welding machine has a tool, in particular a sonotrode, which can be rotated, not only around the longitudinal axis, but also around its transverse axis running perpendicular thereto. This results in an optimal utilization of the working surfaces, whereupon one working surface fulfills more or less the function of two working surfaces.

The invention concerns in particular an ultrasonic welding machine having a sonotrode as tool, which has two mutually opposite end faces, of which at least one rests against an element such as a booster and/or converter, whereby the sonotrode has two first surfaces, and two second surfaces, which are arranged diametrically opposite with respect to the longitudinal axis of the sonotrode, and the two first surfaces and/or the two second surfaces overlap, whereby respectively one surface is a working surface when it is aligned on a backplate electrode.

An optimal utilization of each working surface is achieved in that these are worn uniformly by the shifting of the sonotrode, whereby a higher service life of the sonotrode can be achieved.

In other words, one working surface can be used as two working surfaces pursuant to the invention.

The sonotrode consists in particular of cylindrical end sections having the end faces and a central section running between them, wherein the central section is comprised of an outer first and inner second trapezoidal section running symmetrical with respect to the plane that intersects the working surfaces, and by a cuboid inner section delimited by the second trapezoidal sections, from which the working surfaces originate.

The central section increases in height starting at the end section in the direction toward the diametrically opposite working surfaces.

The geometry of the cuboid inner section is selected in such a way that the respective end faces of the cuboid inner sections that project over the peripheral surfaces of the end sections as well as also of the trapezoidal sections are first, or two second working surfaces.

At least one end face of the sonotrode is preferably connected to a booster of the ultrasonic welding machine. As an alternative, it is possible, however, to connect one of the end faces to a converter, and to connect the other end face to a booster. As a further alternative, it should be taken into consideration that each particular end face is connected to a converter.

Insofar as the end faces are connected to a respective converter, the sonotrode has preferably a length of 3/2 λ, with λ=wavelength of the ultrasonic vibration, so that a power input in the same direction can take place via the converter. If a sonotrode with a length λ is used, then the electrical signals of the converter are reflected.

According to a further proposal of the invention that is to be emphasized, it is provided that the ultrasonic welding machine as a tool has a backplate electrode (also called anvil), which has diametrically opposite working surfaces in relation to its longitudinal axis, wherein respectively one longitudinal side of the working surface is delimited by a cutting edge that runs along the longitudinal axis of the sonotrode. The end face of the backplate electrode is symmetrical with respect to a plane in which the transverse axis of the backplate electrode lies, which intersects the longitudinal axis of the backplate electrode at a right angle.

Through a corresponding configuration of the backplate electrode the possibility is given of rotating the same, not only around its longitudinal axis, which runs parallel to the longitudinal axis of the sonotrode, but also to selectively connect its end faces, for example to a mounting, so that as a consequence a double utilization of each of the diametrically opposite working surfaces occurs, that is, four working surfaces are available as a consequence. An optimal utilization of the backplate electrode is possible this way, so that a service life can be achieved.

The backplate electrode is intended in particular for ultrasonic welding machines for sealing or welding and separating pipes of refrigerating sets, so that a left or a right end of the pipe can be separated by moving the backplate electrode, that is, by rotating the same around the transverse axis.

It is particularly provided that the backplate electrode has in its respective end face a recess that is passed through by the longitudinal axis in order to ensure with constructionally simple measures a correct alignment of the backplate electrode on a mounting surface of the ultrasonic welding machine from which a corresponding projection that engages into the recess originates. The recess is in particular a recess that extends over the entire end face transversely to the transversal axis of the backplate electrode.

The invention is also characterized by a tool of an ultrasonic welding machine in the form of a sonotrode having two mutually opposite end faces, and at least one surface that can be aligned as working surface on a backplate electrode, which runs between the end faces and perpendicular or approximately perpendicular to the end faces, wherein the sonotrode has two first surfaces and two second surfaces, which are arranged diametrically opposite with reference to the longitudinal axis of the sonotrode, and the two first surfaces, and/or the two second surfaces overlap, so that the surface aligned on the backplate electrode is the respective working surface.

BRIEF DESCRIPTION OF THE DRAWINGS

Further details, advantages, and features of the invention result not only from the claims and the features disclosed therein, per se or in combination, but also from the following description of the preferred embodiments shown in the drawings, wherein:

FIG. 4 shows a schematic diagram of an ultrasonic welding machine; and

FIG. 5 shows a partial section of FIG. 4.

DESCRIPTION OF THE PREFERRED EMBODIMENTS

Figure 1:
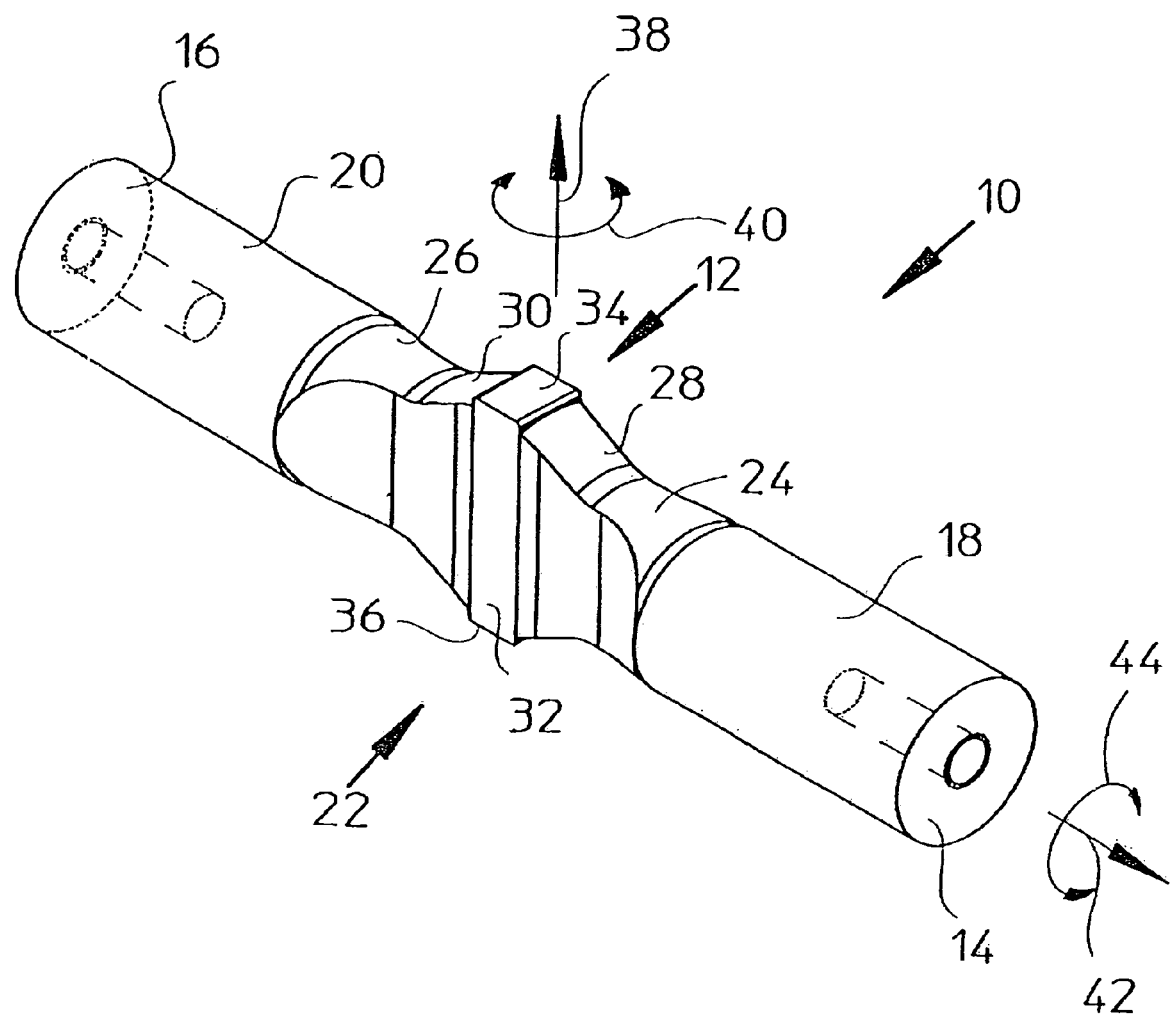
FIG. 1 shows a backplate electrode of an ultrasonic welding machine.

In the figures the fundamental tools of an ultrasonic welding machine are shown as basic structure for compressing and welding metal materials such as flexible wires or pipes, or to be able to separate sections of these.

The ultrasonic welding machine has a sufficiently known design, which comprises as essential components, aside from a control, a generator, a converter, a sonotrode, via which the ultrasonic vibrations are transmitted to the material to be compressed or welded, as well as a backplate electrode. The sonotrode and backplate electrode may be sections of a compression chamber open on the face side. The missing boundary surfaces are formed by side elements, of which at least one can be displaced. Between the converter and the sonotrode a booster can be arranged in order to achieve an amplification of the vibrations. Fundamental superstructures of ultrasonic welding machines and their functions can be seen in the German publication entitled "Die Bibliothek der Technik", Vol. 108, Ultrasonic Metal Welding, verlag moderne industrie, Landsberg/Lech, 1985, and reference is made herein expressly to its contents FIGS. 4 and 5 show merely as an example an ultrasonic welding machine 100, or a partial section thereof, by means of which, for example, flexible wires 102 are to be welded. The flexible wires 102 are introduced for this purpose into a compression chamber 104. The compression chamber 104 is delimited by the working and welding surfaces of an anvil 106, and a sonotrode 108, a side shifting device 110, as well as a guide 112 for the anvil 106.

The guide 112, anvil 106, and side shifting device 110 can be shifted therein with respect to each other in such a way that the compression chamber 104 can be adjusted in its cross section to the flexible wires 102, which are to be welded. In this respect, reference is made to sufficiently known designs, such as those described, for example, in EP-B-0 723 713.

The sonotrode 108, which will be explained in more detail in connection with FIG. 1, and which is identified therein with the reference number 10, is connected via a booster 114 to a converter 116. The sonotrode 108 is positioned in a nodal point. The corresponding bearings are identified with the reference numbers 118 and 120. The working surface of the sonotrode 108, which delimits the compression chamber 104, runs in the antinode of the sonotrode 108.

As clarified in FIG. 1, the sonotrode 10 shown in detail therein has two mutually opposite end faces 14, 16. The end face 14 can be connected, for example, to a booster or a converter, and the end face 16 can be connected, if required, to a booster or a converter. However, it is not necessary that each end face 14, 16 is connected to an element of the ultrasonic welding machine. The sonotrode 10 preferably has a length λ, which corresponds to the wavelength of the ultrasonic vibrations to be applied.

The sonotrode 10 consists of cylindrical end sections 18, 20 and a central section 22, which is comprised in turn by outer first trapezoidal sections 24, 26, and inner second trapezoidal sections 28, 30, which in turn delimit a cuboid inner section 32, whose diametrically opposite end faces 34, 36 form the working surfaces of the sonotrode 10. Thereby each end face and working face 34, 36 is utilized doubly therein because the sonotrode 10 can be rotated (arrow 40) around its transverse axis (arrow 38). This results in an optimal utilization of the respective working surface 34 or 36, which as a consequence executes the function of respectively two working surfaces. Furthermore, one of the working surfaces 34 or 36 can be selectively aligned to a backplate electrode (which is not shown), in which the sonotrode 10 can be rotated around its longitudinal axis (arrow 40), as is indicated by the arrow 44.

It can also be seen from the depiction shown in the drawing that the sonotrode 10 increases in height starting at the end sections 18, 20 in the direction toward the working surfaces 34, 36, whereas the width is smaller than that of the end sections 18, 20 at least in the outer and inner trapezoidal sections 24, 26, or 38.

In other words, the central section 22 can be defined as plate-shaped at least in the area of the inner trapezoidal sections 28, 30 as well as in the area of the inner section 32, whereas the end sections 18, 20 have a cylindrical shape. The transition between the plate-shaped section and the end sections 18, 20 is formed by the outer first trapezoidal sections 24.

The depiction in the drawing of FIG. 1 furthermore clarifies that the sonotrode 10 has a configuration that is symmetrical in relation to two planes. Therein, one plane runs perpendicular to the transverse axis 38. The longitudinal axis 42 is in this plane. The longitudinal axis 42 extends perpendicular with respect to the transverse axis 38, which is in the other plane.

If the sonotrode 10 has two mutually opposite working surfaces 34, 36 arranged in pairs in the embodiment, then it is possible without complications to configure the inner section 32, for example, in star shape, so that four pairs of working surfaces, for example, can be provided.

Figures 2, 3:
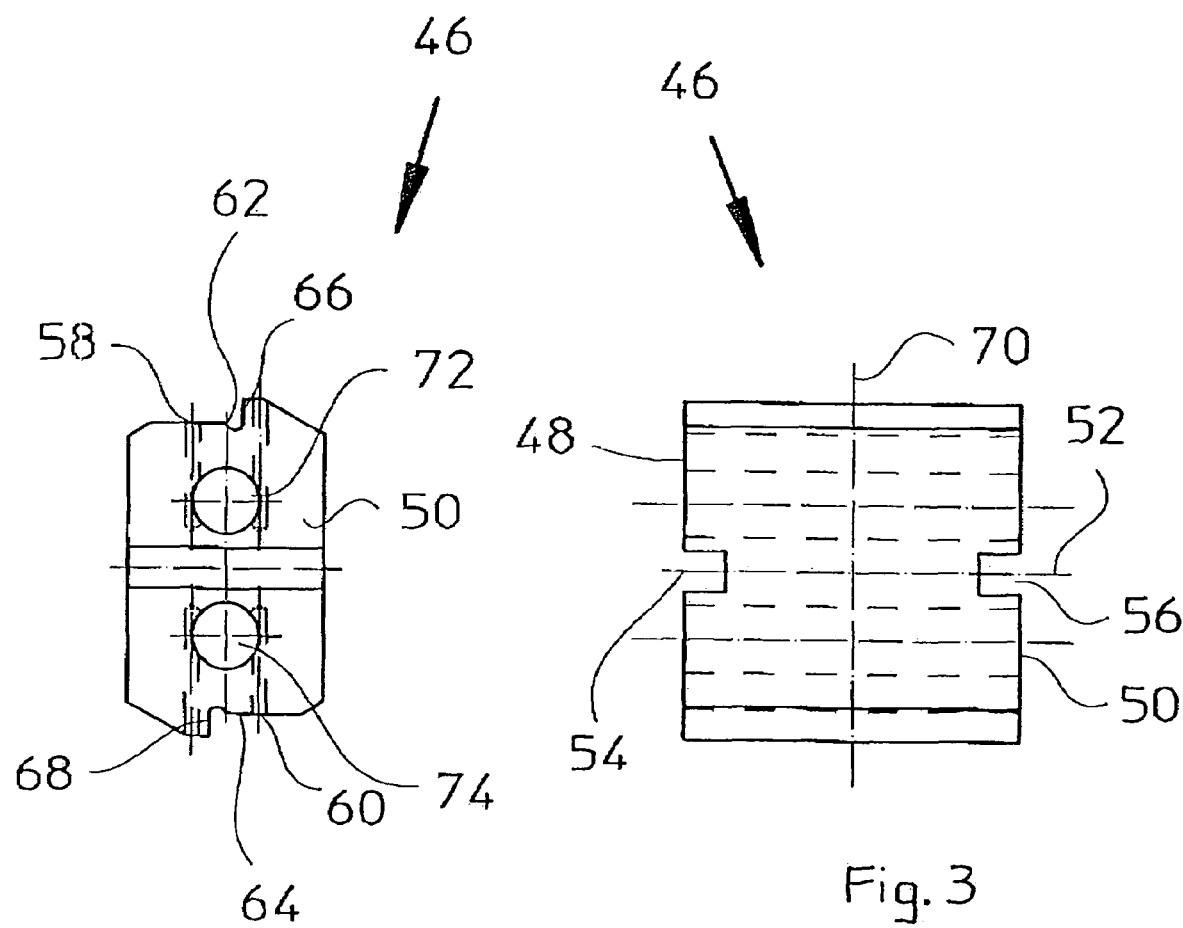
FIG. 2 shows a frontal view of a backplate electrode.
FIG. 3 shows a lateral view of the backplate electrode of FIG. 2.

FIGS. 2 and 3 depict a tool in the shape of a backplate electrode (also called anvil 46), which is intended in particular for sealing or welding and separating pipes, for example, in the cooling technology. The anvil 46 has two end surfaces 48, 50, which rest selectively against a mounted surface of an ultrasonic welding machine. For a positive fixing of the respective end surface 48 or 50 on a mounting surface, the latter has recesses 54, 56, which are rectangular in cross section, extend over the entire width, and are passed through by the longitudinal axis 52 of the anvil 46, into which the correspondingly adapted projection of the mounted surface engages, if the anvil 46 is aligned correctly on the mounting surface.

On the sides of the anvil 46 that lie diametrically opposite in relation to the longitudinal axis 52, working surfaces 58, 60 are provided, which are respectively delimited along the inner longitudinal side 62, 64 by a cutting edge 66, 68, which runs parallel, or somewhat parallel to the longitudinal axis 52 of the anvil 46 and thus along the longitudinal axis of a sonotrode, which is not shown and is assigned to the anvil 46.

Through the design of the working surface 58 or 60, and the assigned cutting edge 66, 68, it is possible to seal or weld and at the same time shear off or cut off a pipe.

The anvil 46 can be rotated pursuant to the invention, not only around its longitudinal axis 52, but also around its transverse axis 70, which runs perpendicular to the longitudinal axis 52, so that each of the working surfaces 58, 60 can be utilized doubly, that is, each working surface 58, 60 can execute the function of two working surfaces. At the same time the advantage is given, that the anvil 46 can be utilized in order to be able to separate a pipe to be compressed selectively either on the right or on the left. Thus, a separation occurs always from the same side if the anvil 46 is only rotated around its longitudinal axis 52. If, instead, a rotation occurs around the transverse axis 70, a separation of the pipe can occur on the right instead of on the left, or vice versa.

In the embodiment, the mounting of the anvil 46 on the mounting surface occurs via screws, which run inside bores 72, 74 and which are positioned symmetrically in relation to the longitudinal axis 52.

What is claimed is:

1. An ultrasonic welding machine comprising a sonotrode, an anvil and a side shifting device,
   a tool selected from the group consisting of the sonotrode, the anvil in the form of a backplate electrode, and the side shifting device delimiting a compression chamber and having four working surfaces, which can be selectively aligned with a material to be compressed or welded, and extending transversely with respect to at least one end face of the tool passed through by a longitudinal axis of the tool, the end face resting against an element via which the tool is connected to the ultrasonic welding machine,
   wherein the tool is constructed and arranged to be rotated 180° around the longitudinal axis, and rotated 180° around a transverse axis perpendicular thereto, to a desired position with respect to the element in order to align one of the working surfaces with the material, and
   wherein the tool is movable or mountable in a desired position with respect to the element that connects the tool to the ultrasonic welding machine.

2. The ultrasonic welding machine of claim 1, wherein the element is a holder, booster, or converter.

3. The ultrasonic welding machine of claim 1, wherein the tool is the sonotrode and has two mutually opposed end faces, at least one of said end faces resting against the element of the ultrasonic welding machine, and
   wherein the sonotrode has two first working surfaces and two second working surfaces arranged diametrically opposite in relation to the longitudinal axis of the sonotrode, and the two first surfaces, and/or the two second surfaces overlap, so that a surface is a working surface when aligned on a backplate electrode.

4. The ultrasonic welding machine of claim 3, wherein the two first surfaces and/or the two second surfaces of the sonotrode have identical or substantially identical surface extensions.

5. The ultrasonic welding machine of claim 1, wherein the tool is the sonotrode and includes cylindrical end sections having end faces and a central section running between the cylindrical end sections, the central section comprising outer first and inner second trapezoidal sections running symmetrically to a plane that intersects the surfaces, and the surfaces originate form a cuboid inner section delimited by the second trapezoidal sections.

6. The ultrasonic welding machine of claim 5, wherein the central section of the sonotrode increases in height starting at the end sections in the direction toward the inner section.

7. The ultrasonic welding machine of claim 5, wherein the end faces of the cuboid inner section of the sonotrode that project over peripheral surfaces of the end sections and the central section are, respectively, the two first or the two second surfaces.

8. The ultrasonic welding machine of claim 1, wherein the tool is the sonotrode and at least one of the end faces thereof is connected to a booster, and the sonotrode has a length $\lambda$, where $\lambda$=wavelength of the ultrasonic vibration.

9. The ultrasonic welding machine of claim 1, wherein the tool is the sonotrode and one of the end faces thereof is connected to a booster, and the opposite end face is connected to a converter of the ultrasonic welding machine.

10. The ultrasonic welding machine of claim 1, wherein the tool is the sonotrode with each end face thereof connected to a converter, and the sonotrode has a length $\lambda$ or $3/2\ \lambda$, where $\lambda$=wavelength of the ultrasonic vibration.

11. The ultrasonic welding machine of claim 1, wherein the tool is the sonotrode and is configured symmetrically with respect to a first plane, which runs perpendicular to the transverse axis of the sonotrode and lies along the longitudinal axis, and is also configured symmetrically with respect to a second plane, which runs perpendicular to the longitudinal axis and lies along the transverse axis.

12. The ultrasonic welding machine of claim 1, wherein the tool is the backplate electrode, wherein each working surface thereof is delimited at a longitudinal side of a cutting edge along the longitudinal axis and diametrically opposite working surfaces on mutually opposite longitudinal sides are delimited by a respective cutting edge, and wherein the end faces of the backplate electrode are configured symmetrically with respect to a plane, in which the transverse axis lies, which intersects the longitudinal axis of the backplate electrode at a right angle.

13. The ultrasonic welding machine of claim 12, wherein each end face of the backplate electrode has a recess that runs over its entire width, which is passed through by the longitudinal axis, and runs perpendicular to the transverse axis.

14. The ultrasonic welding machine of claim 12, wherein two second working surfaces with assigned cutting edges take over the position of the two first working surfaces with assigned cutting edge if the backplate electrode is rotated by 180 degrees around its longitudinal axis.

* * * * *